United States Patent [19]

Brose

[11] 4,117,786

[45] Oct. 3, 1978

[54] INLET AIR PREHEATING FOR PYROLYSIS SYSTEM

[75] Inventor: Harlan F. Brose, East Hartford, Conn.

[73] Assignee: United Technologies Corporation, Hartford, Conn.

[21] Appl. No.: 800,113

[22] Filed: May 24, 1977

[51] Int. Cl.² .................. F23L 15/00; C10B 49/02
[52] U.S. Cl. ............................... 110/229; 110/254
[58] Field of Search ............... 110/8 R, 8 C, 11, 12, 110/31; 122/5

[56] References Cited

U.S. PATENT DOCUMENTS

| | | | |
|---|---|---|---|
| 2,145,090 | 1/1939 | Lewers | 110/12 |
| 3,511,194 | 5/1970 | Stookey | 110/31 |
| 3,771,468 | 11/1973 | Kelly | 110/11 |

Primary Examiner—Kenneth W. Sprague
Attorney, Agent, or Firm—Charles A. Warren

[57] ABSTRACT

The air entering the reactor in a pyrolysis system is preheated by burning a part of the process gas from the reactor in the entering air, thereby maintaining an inlet temperature to prevent solidifying of the slag in the furnace, to maintain the pyrolytic reaction and to reduce the quantity of free oxygen in the entering air.

6 Claims, 2 Drawing Figures

INLET AIR PREHEATING FOR PYROLYSIS SYSTEM

BACKGROUND OF THE INVENTION

When atmospheric air is blown into the reactor of a pyrolysis system, the cooling effect may slow down the pyrolytic reaction taking place and the slag discharging from the base of the reactor may be cooled enough to affect its free flowing discharge. If the air entering the reactor is not preheated more of the carbonaceous material must be burned in this air to produce the necessary high temperatures for pyrolysis to occur effectively. To avoid this, a heat exchanger is used for heating the incoming air utilizing the heat in the process gas discharging from the reactor. This necessitates a large heat exchange unit because of the quantities of air and process gas being utilized and also necessitates controls to maintain the desired air inlet temperature. The heat exchange unit being fabricated from heat resistant material is a high expense part of the device. Further, the process gas must be purged of impurities before entering the exchanger to avoid deposition of foreign matter in the exchanger that would necessitate frequent extensive cleaning or replacement.

Because of the high cost of these pyrolysis systems, it is desirable to avoid any unnecessary accessories. The heat exchanger represents a high cost item that if it can be eliminated would show a significant reduction in the total cost.

SUMMARY OF THE INVENTION

In a properly operating pyrolysis reactor the addition of hot air at the base of a vertical-shaft reactor and the combustion of some of the carbonaceous material at the base of the reactor can provide the necessary temperature for the material further up in the reactor to sustain the desired pyrolytic reactions. Further, this combustion near the base of the reactor sustains a high temperature in this area which causes the inert materials in the refuse to melt, forming a slag. Accordingly, it is desirable to heat the incoming air so that its addition to the combustion zone will not cool the slag by its initially cooler temperature. By burning a part of the pyrolysis gases discharging from the top of the reactor in the air entering the base of the reactor, the air will be preheated enough to avoid this cooling effect. It has been found that, by burning a part of the process gas in this way, the air is heated to the desired temperature without the need for any heat exchanger and the air temperature may be readily controlled by adjusting the quantity of gas being burned. It is believed that once the pyrolytic action is started, only enough heat may be needed to replace heat loss, since the pyrolytic action is believed to be self-sustaining without the need for additional heat for this purpose.

Accordingly, the principal feature of this invention is the heating of the air entering the pyrolysis reactor by burning in it a part of the process gas, thereby eliminating entirely the need for a heat exchanger for heating the air.

Another feature is the cooling of the reactor wall by the circulation of the entering air around the wall prior to the combustion therein, thus utilizing the air at its coolest and thus most effective temperature for cooling purposes. This cooling concept could be less effective if the air were to be further heated by a heat exchanger since with the air already preheated by cooling the reactor wall there would be a smaller temperature differential between the process gas and the heated air. The heat exchanger would need to be a larger size to be equally effective.

According to the invention, the entering air, under a small pressure as from a blower, enters the bottom of the reactor, a part of the air mixed with some of the process gas, in proper proportions for combustion; and this mixture is burned and mixed with the remaining air either externally of or within the reactor. Suitable valving may control the proportions of the air and gas to assure proper combustion and to raise the entering air temperature to that necessary to maintain the desired reaction and to keep the slag from congealing and plugging the discharge.

The foregoing and other objects, features, and advantages of the present invention will become apparent in the light of the following detailed description of preferred embodiments thereof as illustrated in the accompanying drawing.

DESCRIPTION OF THE PREFERRED EMBODIMENT

Figure 1:
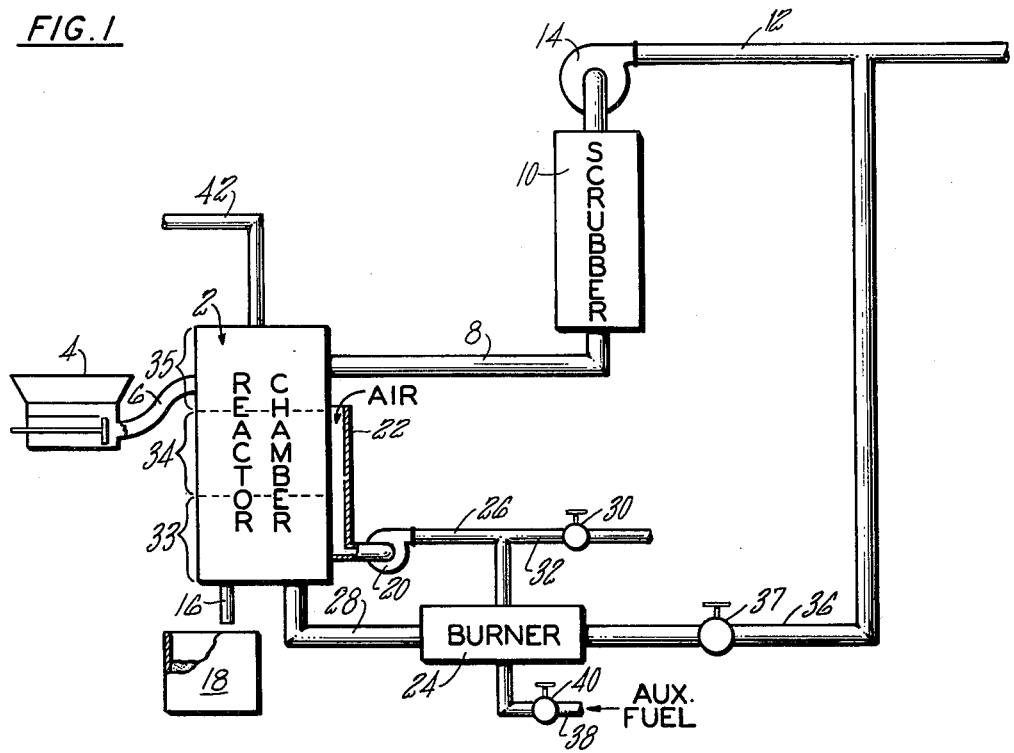
FIG. 1 is a diagrammatic showing of apparatus embodying the invention.

Referring first to FIG. 1, the pyrolysis system includes in part a reactor chamber 2 into which refuse is discharged from a loader 4 through a duct 6. The refuse may be the waste from a manufacturing plant, garbage as from a municipality rubbish collection, or other trash or refuse to be converted without pollution of the atmosphere by combustion.

Pyrolytic reaction within the reactor produces process gas discharged through a duct 8 to a scrubber 10, which removes solid or liquid impurities in the gas. From the scrubber, the process gas which is burnable is delivered by a duct 12 to a place of use such as the boiler in a power house. A compressor 14 may be used to increase the pressure.

Slag, a waste product from the reactor, which is fluid at reactor temperatures, flows out a discharge opening 16 where it drops into a tank 18 in which it is cooled. The tank may be partly filled with water as a cooling medium.

Air for the reactor is supplied by a blower 20 which draws air through a cooling jacket 22 on the wall of the reactor and delivers the air to a burner 24 through a duct 26. From the burner, heated air flows through the delivery duct 28 into the base of the reactor. A valve 30 in a bypass duct 32 on duct 26 controls the quantity of air to the burner. If this air were not heated before it entered the reactor, it could cool the melted slag to such a point that it would not flow freely from the reactor, thus detrimentally affecting or even stopping the reactor.

The reactor chamber 2 has a combustion zone 33 directly above the base in which a part of the carbonaceous material is burned with the incoming air to raise the temperatures within the chamber to cause the desired pyrolytic reaction. Directly above the combustion zone is the pyrolytic reaction zone 34 in which the pyrolysis of the material in the chamber takes place. This pyrolysis occurs effectively once the material in the chamber reaches the temperatures at which it will occur. Above the pyrolysis zone is the loading zone 35 into which the refuse if dumped by the loader.

Process gas reaches the burner through a duct 36 from a point downstream of the blower 14, and a valve 37 in this duct controls the quantity of gas entering the burner. Suitable control of the valves 30 and 37, separately or in combination, permits a control of the temperature of the air entering the reactor.

Other accessories are necessary to overall operation of the reactor such as cooling water for the scrubber, coolant for the water in tank 18, and an auxiliary supply of fuel to the burner 24 for starting the reactor operation until it is producing process gas. These features have no direct bearing on the present invention and will not be described in detail. It is sufficient to note that a duct 38 may supply auxiliary fuel to the burner for starting operation, this duct having a control valve 40.

In operation, the reactor is started by the delivery of air from blower 20 through the burner 24 to the reactor with auxiliary fuel burned in the air to raise the temperature in the reactor to the necessary temperature to start combustion within the reactor at the base and to cause the pyrolytic reaction to take place above this combustion. The inlet temperature of the air at the base of the reactor is desirably 1400° F. and the temperature at the combustion zone near the base is about 2400° F. for best slagging operation. Above this combustion zone, the temperatures range from 2400° F. just above the combustion part through the mid-section where the pyrolysis occurs to about 800° F. near the top, thus providing adequate temperatures to pyrolyze the incoming material.

When process gas is discharging from the reactor and through the scrubber, some of this gas is delivered to the burner and the auxiliary fuel is shut off. The temperature of the inlet air is then controlled by valves 30 and 37 for steady state operation. Pyrolytic reaction then continues in the reactor, with a slag discharging from the base of the reactor and the gaseous reaction products delivered through duct 8. The loader maintains a delivery of waste material to the reactor as the material therein is pyrolyzed.

The basic functions of the reactor are well known. The volatiles in the refuse are first driven off and the solid material is then pyrolyzed, reactant steam being supplied through a water or steam inlet 42 at the top of the reactor. This solid matter, at the temperatures within the reactor, breaks down in the presence of the high temperature stream and produces free hydrogen and oxides such as carbon monoxide from the carbon in the waste. The material that will not pyrolyze into gaseous products becomes the slag discharging from the base of the reactor.

Figure 2:
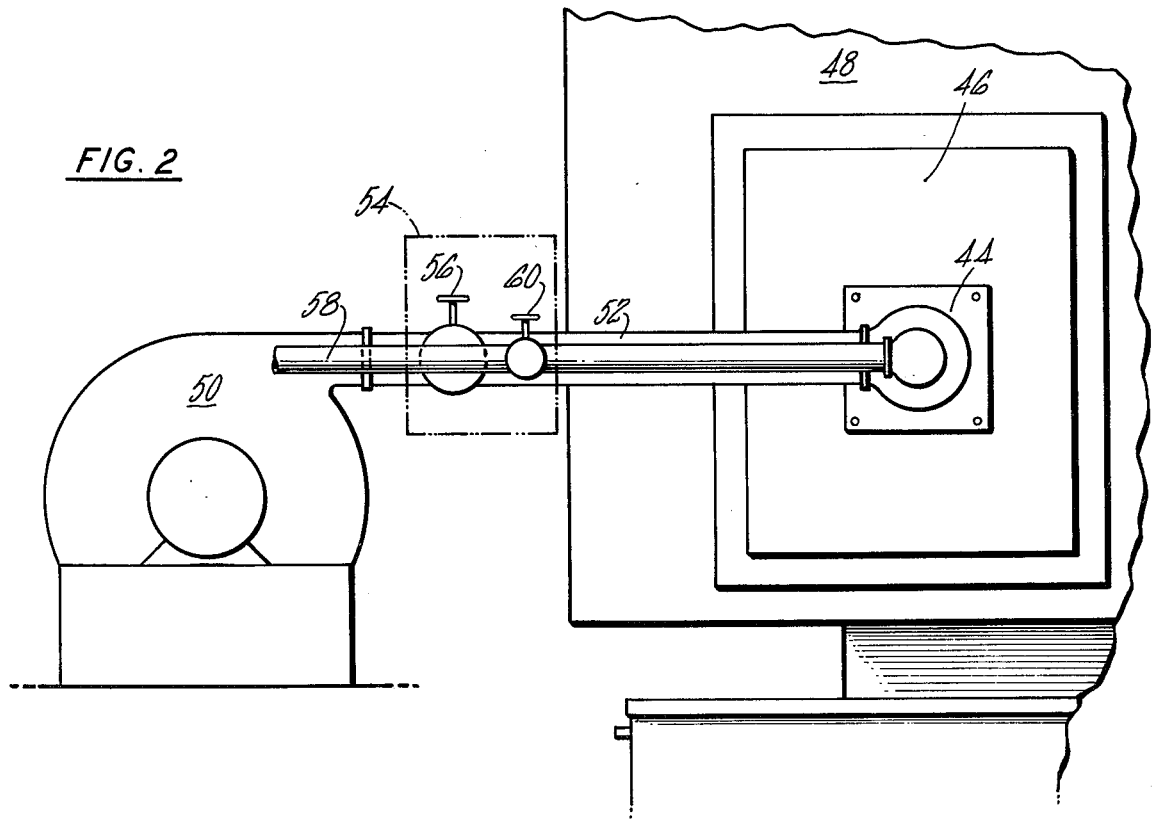
FIG. 2 is a detail of a particular apparatus for this purpose.

In FIG. 2 is shown a burner arrangement in which the burner 44 is mounted on the wall of a combustion chamber 46 from which the products of combustion and excess air discharge directly into the reactor, the chamber 46 being mounted on the reactor wall 48. The inert air from the blower 50 reaches the burner by a duct 52 through a control box 54 in which a suitable valve 56 adjusts the quantity of air entering the burner. The process gas enters the burner through a duct 58 having a control valve 60 therein. These control valves are shown as manually adjusted; it is understood that they can be interconnected for simultaneous adjustment, if desired. The box 54 may also include temperature sensing apparatus for monitoring the operating temperatures within the reactor and for automatic control of the valves 56 and 60 to automate the functioning of the pyrolytic system.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a pyrolytic reactor,
a reaction chamber having a process gas outlet adjacent the top leading to a point of utilization of the process gas,
means for supplying air to the base of the chamber to promote combustion and a pyrolytic action in the chamber,
a burner in said air supplying means, and
a branch connection from said gas outlet to said burner in said air supplying means for mixing some of the process gas with the supplied air to be burned therein for raising the temperature of the entering air.

2. A reactor as in claim 1 including valve means in said branch connection for controlling the quantity of process gas delivered to said air supplying means.

3. A reactor as in claim 1 including valving in both said connection and said means for supplying air thereby to control both the air supply and the process gas.

4. In a pyrolytic reactor,
a reaction chamber having a combustion zone at the base thereof and a pyrolysis reaction zone directly above the combustion zone and heated by the combustion occurring therein,
an outlet at the top of the chamber for discharge, to a point of use process gas resulting from the reactions within the chamber, this gas being combustible,
an inlet means at the bottom of the reactor chamber,
a burner associated with and connected to said inlet means,
means for supplying air to said burner and thence to the inlet, and
a branch connection from said process gas outlet to said burner for the delivery of some of the process gas to said burner and thence to the inlet means for combustion of the gas with the inlet air to heat the gas entering the inlet means.

5. A reactor as in claim 4 including valve means to control the quantity of process gas withdrawn from the outlet for delivery to said burner.

6. A reactor as in claim 5 including valve means for both said process gas and the incoming air to control the supply of both gas and air to said burner.

* * * * *

UNITED STATES PATENT AND TRADEMARK OFFICE
CERTIFICATE OF CORRECTION

PATENT NO. : 4,117,786
DATED : October 3, 1978
INVENTOR(S) : Harlan F. Brose

It is certified that error appears in the above-identified patent and that said Letters Patent are hereby corrected as shown below:

Column 2, line 7, after "air" insert --being--.

Column 2, line 17, after "become" insert --more--.

Column 3, lines 23 and 24, after "combustion" insert --area--.

Signed and Sealed this

Tenth Day of July 1979

[SEAL]

Attest:

*Attesting Officer*

LUTRELLE F. PARKER
*Acting Commissioner of Patents and Trademarks*